United States Patent
Poirier et al.

(10) Patent No.: US 10,876,578 B2
(45) Date of Patent: Dec. 29, 2020

(54) BEARING ASSEMBLY WITH INNER RINGS AND METHOD OF ALIGNMENT

(71) Applicant: PRATT & WHITNEY CANADA CORP., Longueuil (CA)

(72) Inventors: Cedric Poirier, Montreal (CA); Marc-Andre Pelletier, St-Philippe (CA); Michel Jean, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/415,381

(22) Filed: May 17, 2019

(65) Prior Publication Data
US 2020/0362916 A1 Nov. 19, 2020

(51) Int. Cl.
*F16C 33/60* (2006.01)
*F16C 33/66* (2006.01)
(Continued)

(52) U.S. Cl.
CPC .......... *F16C 33/6681* (2013.01); *F16C 19/06* (2013.01); *F16C 33/585* (2013.01); *F16C 2360/23* (2013.01)

(58) Field of Classification Search
CPC ...... F16C 33/585; F16C 33/586; F16C 33/60; F16C 33/6651; F16C 33/6681; F01D 25/18
(Continued)

(56) References Cited

U.S. PATENT DOCUMENTS 4,334,720 A 6/1982 Signer
4,463,994 A * 8/1984 Eliason ............... F16C 33/6677
384/506
(Continued)

FOREIGN PATENT DOCUMENTS

CA 2968958 A1 12/2017
CN 205207426 U 5/2016
(Continued)

*Primary Examiner* — Marcus Charles
(74) *Attorney, Agent, or Firm* — Norton Rose Fulbright Canada LLP (57) ABSTRACT

A bearing alignment assembly comprises an outer ring. An inner ring assembly is disposed radially inwardly of the outer ring and cooperating therewith to form a roller volume. The inner ring assembly has a forward inner ring and an adjacent aft inner ring cooperating to provide an inner surface of the inner ring assembly. The forward inner ring includes axial grooves extending axially along and circumferentially spaced around a forward portion of the inner circumferential surface of the inner ring assembly. One or more of the axial grooves of the forward inner ring being an alignment axial groove having at least one cross-sectional dimension different than a corresponding cross-sectional dimension of other of the axial grooves of the forward inner ring, the aft inner ring including axial grooves extending axially along and circumferentially spaced around an aft portion of the inner circumferential surface, at least one of the axial grooves of the aft inner ring having the different cross-sectional dimension and positioned on the aft inner ring for alignment with the alignment axial groove. Rolling elements are rollingly disposed in the roller volume for relative rotational motion of the outer ring and the inner ring assembly.

20 Claims, 5 Drawing Sheets

(51) Int. Cl.
*F16C 19/06* (2006.01)
*F16C 33/58* (2006.01)

(58) Field of Classification Search
USPC ............... 384/462, 465, 473, 475, 506, 499
See application file for complete search history.

(56) References Cited

U.S. PATENT DOCUMENTS

| | | |
|---|---|---|
| 4,466,165 A | 8/1984 | Otto |
| 5,106,209 A | 4/1992 | Atkinson et al. |
| 6,318,899 B1 * | 11/2001 | Boyd .................... F02F 7/0087 384/492 |
| 6,409,464 B1 | 6/2002 | Fisher et al. |
| 7,604,239 B2 | 10/2009 | Chitren et al. |
| 7,931,407 B2 * | 4/2011 | Begin ..................... F01D 25/18 384/475 |
| 8,616,772 B1 | 12/2013 | Kellar et al. |
| 8,616,777 B1 | 12/2013 | Smith et al. |
| 9,599,161 B2 * | 3/2017 | Walker ................... F16C 33/60 |
| 9,638,256 B2 | 5/2017 | Duffy |
| 9,644,541 B2 | 5/2017 | Snecma et al. |
| 10,174,635 B2 * | 1/2019 | Walker .................... F01D 25/16 |
| 10,174,791 B2 * | 1/2019 | Beauvais ................ F16C 19/02 |
| 10,260,563 B2 | 4/2019 | Fisher |
| 2009/0235887 A1 * | 9/2009 | Oishi ...................... F01L 1/053 123/90.38 |
| 2013/0004109 A1 * | 1/2013 | Metzger ................ F16C 33/664 384/473 |
| 2016/0025140 A1 | 1/2016 | Walker et al. |
| 2018/0335091 A1 | 11/2018 | Turmeau et al. |

FOREIGN PATENT DOCUMENTS

| | | | |
|---|---|---|---|
| CN | 107014617 A | 8/2017 | |
| CN | 107061488 A | 8/2017 | |
| CN | 208220902 U | 12/2018 | |
| CN | 109483262 A | 3/2019 | |
| EP | 221727 B1 | 2/1991 | |
| EP | 1640627 A1 * | 3/2006 | ............. F01D 25/18 |
| EP | 3176076 B1 | 5/2019 | |
| JP | 11336772 A * | 12/1999 | ............. F16C 19/225 |
| WO | WO-2009020087 A1 * | 2/2009 | ............. F16C 33/585 |

* cited by examiner

FIG-1

BEARING ASSEMBLY WITH INNER RINGS AND METHOD OF ALIGNMENT

TECHNICAL FIELD

The application relates generally to ball bearing assemblies and, more particularly, to an inner ring for such an assembly.

BACKGROUND OF THE ART

To reduce wear on bearing assemblies such as those used in gas turbine engines, lubricating fluid such as oil is typically used to keep them cool and lubricate them. In particular, some of these bearing may be high-speed bearings, whereby adequate lubricating may increase their durability. Lubricating fluid (i.e., lubricant such as oil) may be delivered by being channeled through the bearing, for example through axial slots formed on an inside surface of an inner ring of the bearing assembly, with radial holes extending through the inner ring to intersect the axial slots. In ball bearings, the inner ring may be constituted of two inner rings, each with its own set of axial slots. If the axial slots of the two inner rings are not aligned, there may result an insufficient lubrication of the aft inner rings. Indeed, the inner ring aft from the oil feed may receive a limited amount of oil due to misalignment between inner rings, and this may cause a temperature increase, further resulting in a loss of bearing material properties and a reduction of the bearing life.

SUMMARY

In one aspect, there is provided a bearing alignment assembly comprising: an outer ring; an inner ring assembly disposed radially inwardly of the outer ring and cooperating therewith to form a roller volume, the inner ring assembly having a forward inner ring and an adjacent aft inner ring cooperating to provide an inner surface of the inner ring assembly, the forward inner ring including axial grooves extending axially along and circumferentially spaced around a forward portion of the inner circumferential surface of the inner ring assembly, at least one of the axial grooves of the forward inner ring being an alignment axial groove having at least one cross-sectional dimension different than a corresponding cross-sectional dimension of other of the axial grooves of the forward inner ring, the aft inner ring including axial grooves extending axially along and circumferentially spaced around an aft portion of the inner circumferential surface, at least one of the axial grooves of the aft inner ring having the different cross-sectional dimension and positioned on the aft inner ring for alignment with the alignment axial groove, and rolling elements rollingly disposed in the roller volume for relative rotational motion of the outer ring and the inner ring assembly.

In another aspect, there is provided a bearing alignment assembly comprising: a bearing assembly including an outer ring, an inner ring assembly cooperating with the outer ring to form a roller volume, the inner ring assembly having a forward inner ring and a aft inner ring concurrently forming an inner circumferential surface, the forward inner ring including forward axial grooves formed in, extending axially along and circumferentially spaced around the inner circumferential surface of the inner ring assembly, at least one of the forward axial grooves being an alignment axial groove having cross-sectional dimensions CS', while other forward axial grooves having cross-sectional dimensions CS, wherein CS'>CS, and the aft inner ring including aft axial grooves formed in, extending axially along and circumferentially spaced around the inner circumferential surface, and rolling elements in the roller volume rollingly disposed against an inner circumferential surface of the outer ring and an outer circumferential surface of the inner ring assembly, the rolling elements allowing relative rotational motion between the outer ring and the inner ring assembly; and a gauge having cross-sectional dimensions CS' configured for being complementarily received in the alignment axial groove, and for being blocked from being complementarily received in the forward axial grooves having cross-sectional dimensions CS.

In yet another aspect, there is provided a method of assembling a bearing assembly comprising: obtaining a bearing assembly having an outer ring, a split inner ring having forward and aft rings, the forward inner ring including axial grooves extending axially along and circumferentially spaced around the forward ring, one of the axial grooves of the forward inner ring being an alignment axial groove having at least one cross-sectional dimension different than a corresponding cross-sectional dimension of other of the axial grooves of the forward inner ring, the after inner ring including axial grooves extending axially along and circumferentially spaced around the aft inner ring, at least one of the axial grooves of the aft inner ring having the different cross-sectional dimension and positioned on the aft inner ring for alignment with the alignment axial groove, assembling a forward inner ring with aft inner ring; inserting a gauge having a cross-sectional dimension corresponding to the cross-sectional dimension of the forward inner ring alignment groove into the alignment axial groove; rotating one of the forward and aft inner rings until the gauge until the alignment axial groove of the forward inner ring aligns with the at least one axial grooves of the aft inner ring; and inserting the gauge into the at least one axial grooves of the aft inner ring concurrently with the insertion in the alignment groove of the forward inner ring.

DESCRIPTION OF THE DRAWINGS

Reference is now made to the accompanying figures in which.

DETAILED DESCRIPTION

Figure 1:
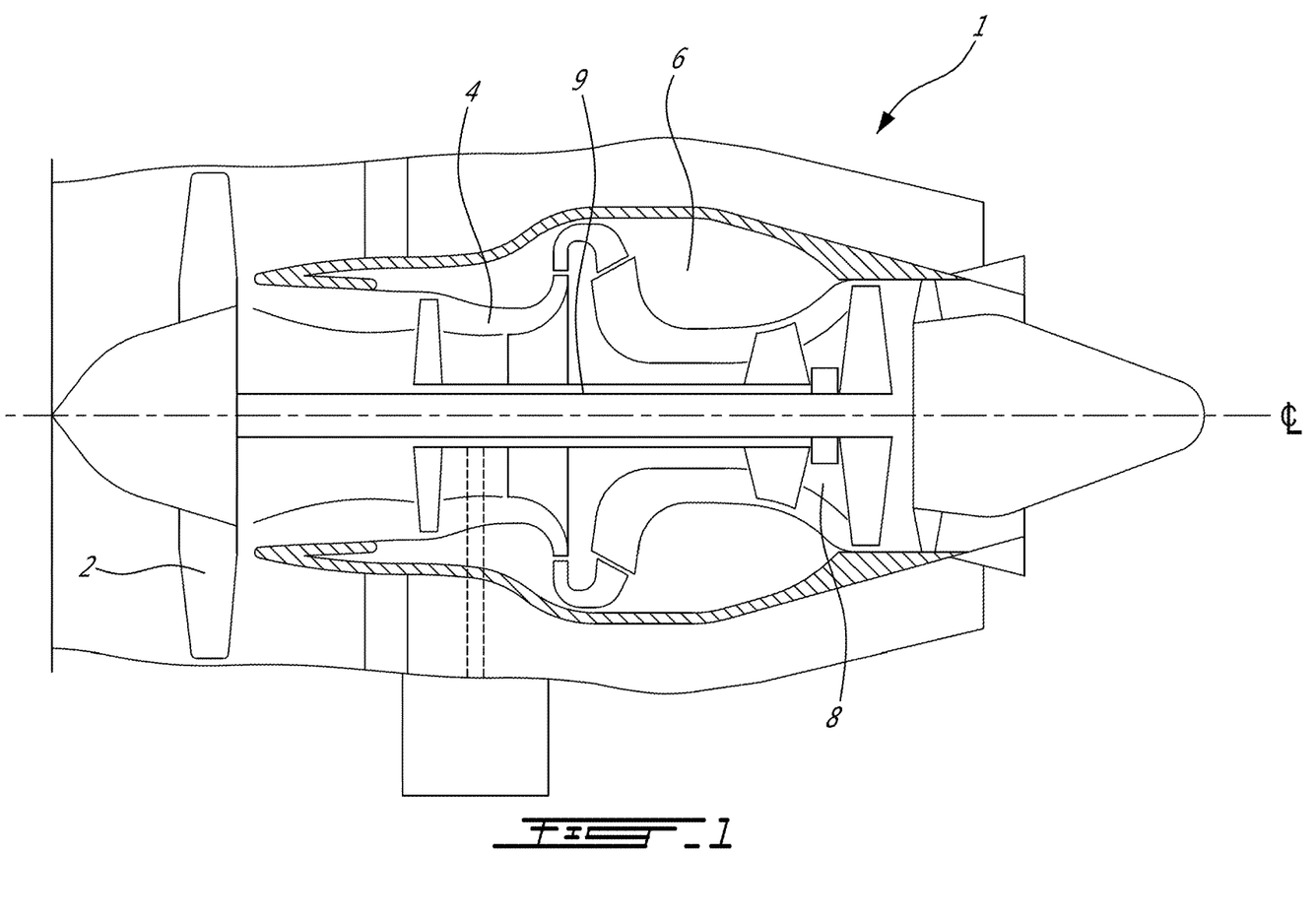
FIG. 1 is a schematic sectional view of a gas turbine engine featuring the bearing assembly of the present disclosure.

FIG. 1 illustrates a gas turbine engine 1 of a type preferably provided for use in subsonic flight, generally comprising in serial flow communication a fan 2 through which ambient air is propelled, a multistage compressor 4 for pressurizing the air, a combustor 6 in which the compressed air is mixed with fuel and ignited for generating an annular stream of hot combustion gases, and a turbine section 8 for extracting energy from the combustion gases. The compressor and turbine sections are appropriately joined by shaft(s) 9 supported by bearings such as a bearing assembly 10 described herein. In some embodiments, engine 1 may be a turbo-fan engine. However, it is understood that aspects of the present disclosure are applicable to other types of engines such as turbo-prop and turbo-shaft for example.

Figure 2:
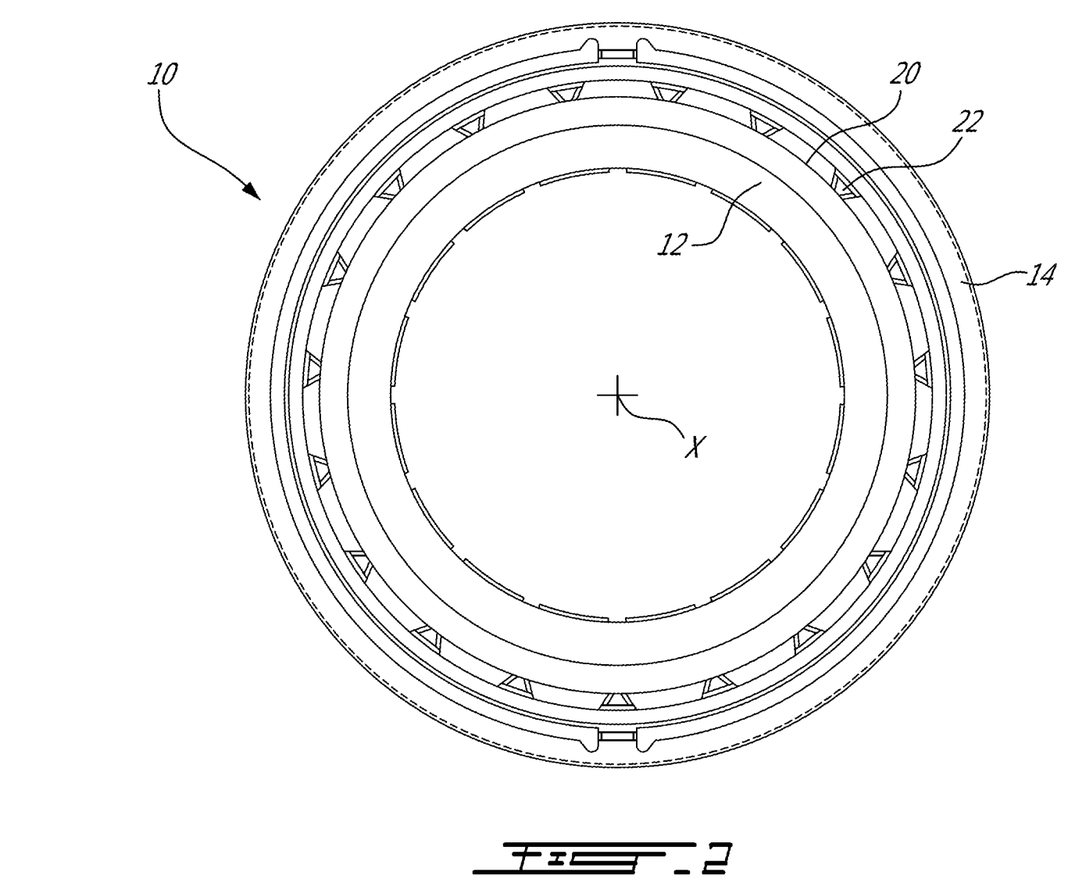
FIG. 2 is a schematic front view of a bearing assembly in accordance with a particular embodiment.
Figure 3:
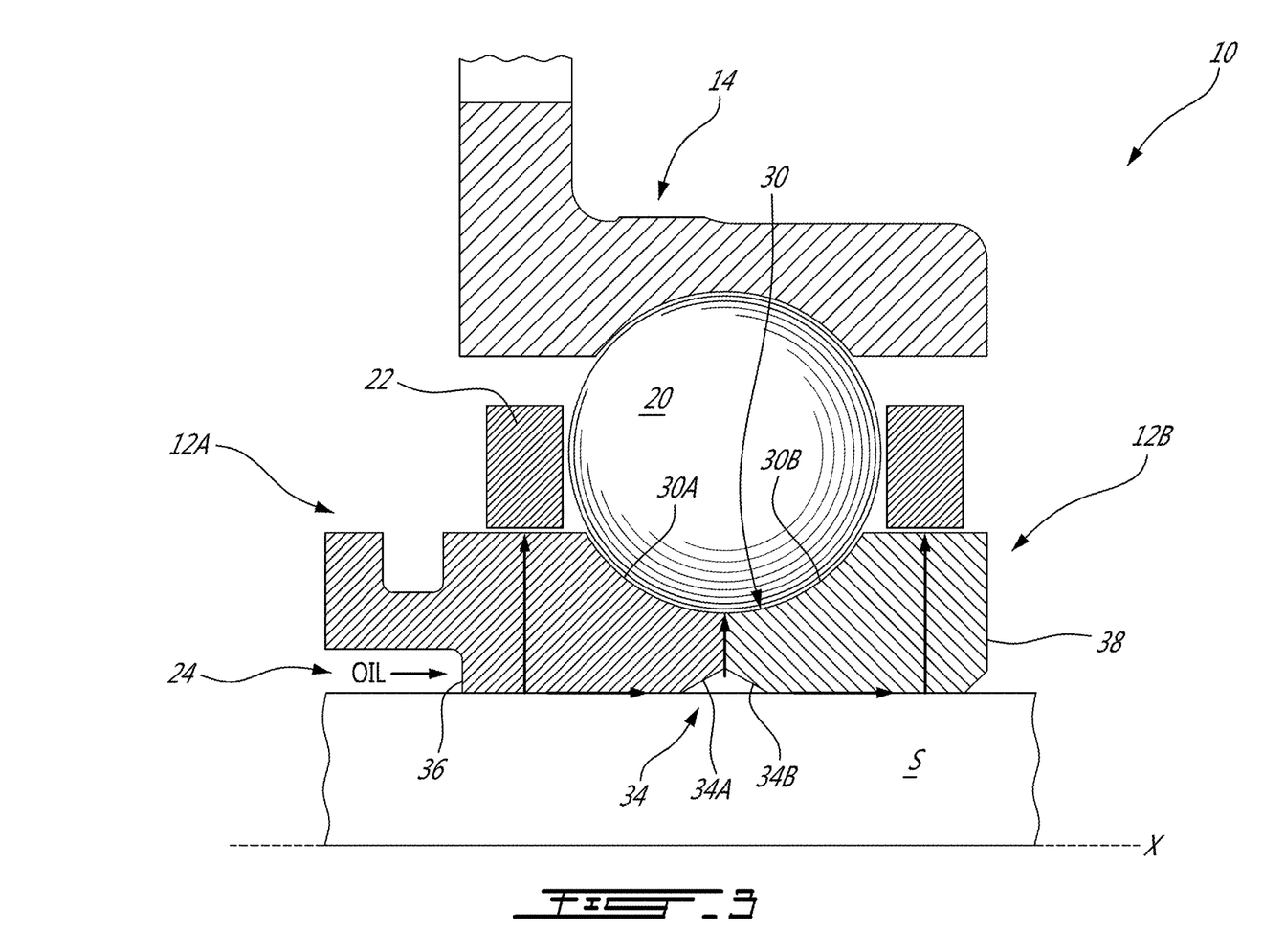
FIG. 3 is a schematic cross-section of part of an inner ring assembly of the bearing assembly of FIG. 2.
Figure 4:
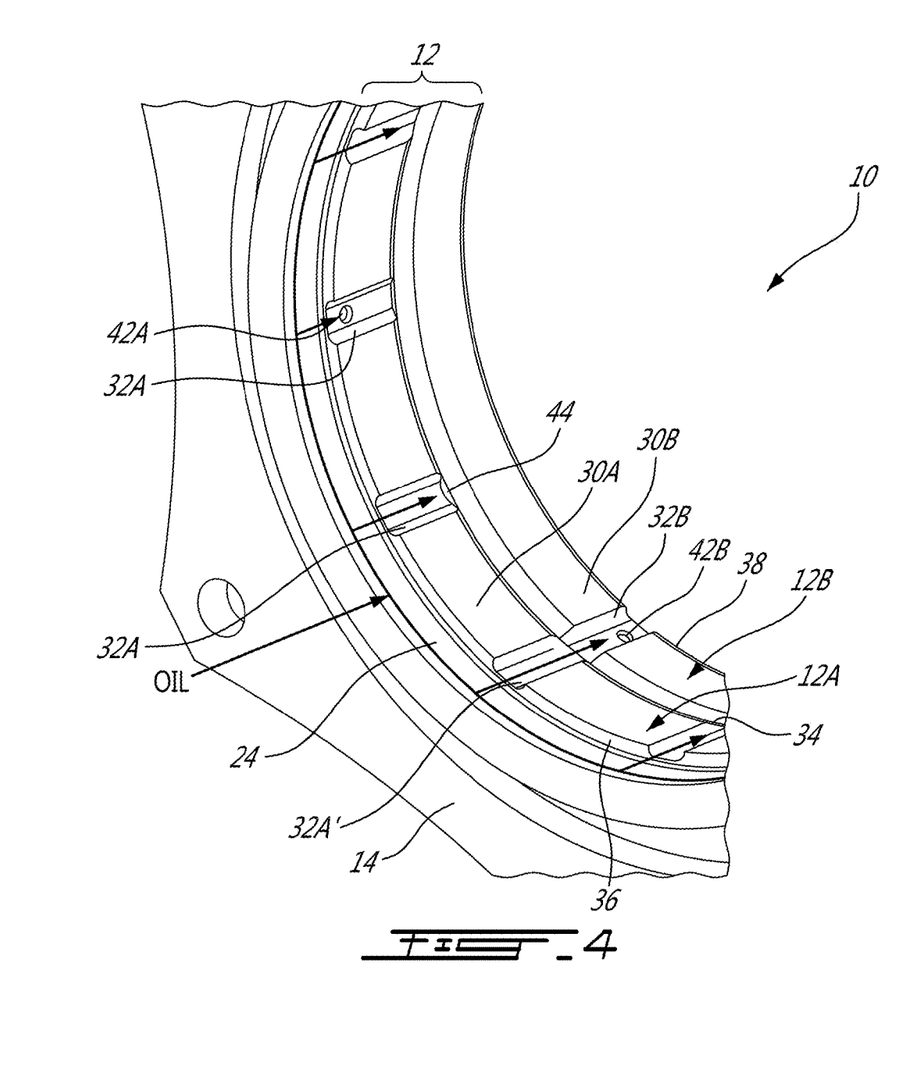
FIG. 4 is a perspective view of the bearing assembly of FIG. 2.

Referring to FIGS. 2-4, an exemplary bearing assembly 10 is shown in more detail in accordance with a particular embodiment. According to an embodiment, the bearing assembly 10 is a high speed ball bearing, in that it may rotate in excess of 2.0 MDN (bearing bore diameter in millimeters times speed in rpm divided by one million), although it may be used in bearing assemblies operating at lesser speeds. The bearing assembly 10 generally includes concentric inner ring assembly 12, also known as an inner ring or a split ring, consisting of a first, forward inner ring 12A and a second, aft inner ring 12B, and outer ring 14 respectively defining concurrently a roller volume including front land, rear land, inner and outer races in which a plurality of bearing elements 20 retained by a cage member 22 are received to allow relative rotation between the inner ring assembly 12 and outer ring 14. The outer ring 14 is connected to or part of a surrounding structure. As an example, the outer ring 14 is fixed to a bearing housing. In the embodiments shown, the bearing elements 20 are balls bearings, but it is understood that other types of bearing elements can alternately be used, such as for example roller bearings and tapered bearings. The cage member 22 is received between the inner and outer rings 12, 14 and equally spaces the bearing elements 20 apart such that each bearing element 20 rotates around the inner and outer races without contacting the other bearing elements 20. A shaft S (FIG. 3) is supported by the inner ring assembly 12 and may hence rotate on itself, about central axis X.

Referring more particularly to FIGS. 2 and 3, the outer ring 14 has a ring body that is centered on the central axis X of the bearing assembly 10, with the outer race being defined on an inner surface thereof around its circumference. Although not shown in FIG. 3, the inner surface may be at the same diameter as the outer race. The inner ring assembly 12 may also be centered on the central axis X of the bearing assembly 10, with the inner race being defined on an outer surface thereof around its circumference. An oil gallery 24 may be defined at an exterior of the forward inner ring 12A.

Referring to FIGS. 3-4, the inner circumferential surface 30 of the inner ring assembly 12 includes a plurality of axial grooves 32. The grooves 32 may also be referred to as slots, among other possibilities. In the figures, the axial grooves 32 may be shown as 32A and 32B (concurrently referred to as 32), the "A" indicating that the axial grooves 32A are forward axial grooves as they are defined in the forward inner ring 12A, the "B" indicating that the axial grooves 32B are aft axial grooves as they are defined in the aft inner ring 12B. In an embodiment, there are fewer axial grooves 32B than axial grooves 32A.

The inner circumferential surface 30 of the inner ring assembly 12 may also include a circumferential groove 34 defined therein, though it may also be absent. If present, the groove 34 may extend about the full circumference of the inner circumferential surface 30 (i.e., 360 degrees). The groove 34 may be less than 360 degrees as well. However, as a single unit, the groove 34 is in fluid communication with each of the axial grooves 32. The groove 34 may be located at a junction or meeting plane between the forward inner ring 12A and the aft inner ring 12B. The meeting plane may have a vector of the central axis X normal to it. The groove 34 may consist of a circumferential groove portion 34A in the forward inner ring 12A and a circumferential groove portion 34B in the aft inner ring 12B. The groove 34 may alternatively be entirely located in either one of the inner rings 12A or 12B.

The axial grooves 32A extend along the axial direction of the bearing assembly 10, and are circumferentially spaced apart in the forward portion of the inner circumferential surface 30 (e.g., the part 30A of the surface in the forward inner ring 12A). In the embodiment shown in FIGS. 2 and 4, the axial grooves 32A may be equidistantly spaced apart around the circumference of the forward inner ring 12A, although a non-equidistant spacing pattern may also be used. Each axial groove 32A extends straight across the inner surface 30 from a first axial face 36 of the inner ring assembly 12 to the circumferential groove 34. A depth of the axial grooves 32A may increase (e.g., linearly) from the forward axial face 36 to the circumferential groove 34, to assist in moving lubricant axially along the grooves 32A.

The axial grooves 32B extend as well along the axial direction of the bearing assembly 10, and are circumferentially spaced apart in the aft portion of the inner circumferential surface 30 (e.g., the part of the surface 30 in the aft inner ring 12B). In the embodiment shown in FIGS. 2 and 4, the axial grooves 32B may be equidistantly spaced apart around the circumference of the forward inner ring 12B, although a non-equidistant spacing pattern may also be used. Each axial groove 32B extends straight across the inner surface 30 from the circumferential groove 34 to a second axial face 38 of the inner ring assembly 12, although the axial grooves 32B could also extend only to radial holes in the inner ring 12B as described hereinafter. Again, a depth of the axial grooves 32B may increase from the circumferential groove 34 toward the aft axial face 38, to assist in moving lubricant axially along the grooves 32B. The depth of the axial grooves 32B at the junction with the circumferential groove 34 may be greater than the depth of the circumferential groove 34, or may be equal but with the depth of the grooves 32B increasing axially as described above, to create a cascade effect.

According to an embodiment, the inner ring assembly 12 may have an equal number of forward axial grooves 32A and of aft grooves 32B. According to an embodiment, the circumferential spacing or circumferential spacing pattern between the forward axial grooves 32A is equal to that between the aft axial grooves 32B. According to another embodiment, the inner ring assembly 12 has an equal number of forward axial grooves 32A and of aft grooves 32B with the equal circumferential spacing or circumferential spacing pattern as well.

Referring to FIGS. 3-4, the inner ring 12 also includes a plurality of radial passages 42, 44 defined therethrough (a.k.a., channels, throughbores, holes, etc). The radial passages 42 are in fluid communication with the axial grooves 32, whereas the radial passages 44 are in fluid communication with circumferential grooves 34 or in the meeting plane. The expression radial is used as the passages 42, 44 are generally traverse to the axial passages 32. In an embodiment, the radial passages 42, 44 are substantially radial (i.e., they are in a radial orientation relative to the central axis X), but they may not be substantially radial.

The radial passages concurrently referred to as 42 are shown as 42A and 42B in the Figs., the "A" indicating that the passages 42A are forward passages as they are defined in the forward inner ring 12A, the "B" indicating that the passages 42B are aft passages as they are defined in the aft inner ring 12B. The radial passages 44 are central passages as they extend into the inner ring assembly 12 from the circumferential groove 34.

The forward/aft passages 42 are defined as shoulder radial passages, whereas the central passages 44 are race radial passages (a.k.a., middle groove). For example, the shoulder radial passages 42 feed the lubricating fluid to the cage piloting surface at shoulders of the inner ring assembly 12 in the roller volume (i.e., front land and rear land), whereas the race radial passages 44 extend through the inner ring assembly 12 to the inner race. The race radial passages 44 provide lubricating fluid directly to the bearing element 20 and the inner race contact interface, i.e., the raceway. In an embodiment, the central passages 44 are defined in the inner ring 12A and are located at ends of the axial grooves 32A, although they may not be axially aligned with the axial grooves 32A. Likewise, the central passages 44 may be defined in the inner ring 12B, provided that the central passages 44 are in fluid communication with the circumferential groove 34.

Referring to FIGS. 4 and 5A-5C, the axial grooves 32A, 32B, circumferential groove 34 if present, and radial passages 42, 44 function together as a series of fluid passages to deliver lubricating fluid to the bearing assembly 10, such that the bearing assembly 10 is lubricated forwardly, centrally and aftly. In an embodiment, there must be a specific alignment of the inner rings 12A and 12B for the bearing assembly 10 to have an optimal lubrication. More particularly, the aft axial grooves 32B must be axially aligned with forward axial grooves 32A that are without radial passages 42A and/or without radial passages 44, for the lubricant to reach the radial passage 42B in the aft axial grooves 32B.

Therefore, according to one embodiment, some of the axial grooves 32A have a radial passage 42A, but not all of them. Moreover, some of the axial grooves 32A lead to a radial passage 44, but not all of them. Therefore, there are some of the axial grooves 32A that do not have a radial passage 42A, and that do not lead to a radial passage 44. One such axial groove is shown as 32A' in FIGS. 4 and 5A-5C, and will be referred to as an alignment axial groove 32A'. Stated differently, in a non-limitative embodiment, there may be different mutually-exclusive types of axial grooves 32A, namely (1) axial grooves 32A having a radial passage 42A, (2) axial grooves 32A without a radial passage 42A and leading to a radial passage 44, and/or (3) axial grooves 32A that do not have a radial passage 42A and that do not lead to a radial passage 44. The embodiment is said to be non-limitative, in that it is contemplated to have axial grooves 32A of types (1) and (3) only, or axial grooves 32A of types (2) and (3) only. In type (3), one or more of the axial grooves may be alignment axial groove(s) 32A'.

The alignment axial groove(s) 32A' distinguishes from all other axial grooves 32A by having a different cross-section than the other axial grooves 32A. In an embodiment, the alignment axial groove(s) 32A' has a greater cross-sectional area CS' taken in a plane parallel to the meeting plane, than a cross-sectional area CS of the other axial grooves 32A. The greater cross-sectional area may be the result of a greater width W and/or a greater depth D', than the width W and the depth D of the other axial grooves 32A. In an embodiment, the depth D and D' may be measured along a radial axis, whereas the widths W and W may be measured may be perpendicular to the radial axes while lying in the plane parallel to the meeting plane. Stated differently, CS'>CS and/or W>W and/or D'>D. The axial grooves 32A having the cross-sectional dimensions W and D do not necessarily have the same cross-sectional areas, as W and D may be ranges of dimensions. According to another embodiment, the difference in cross sections between 32A and 32A' is in terms of shape, such as a semi-circular shape for 32A' (as an example) and a square shape (as an example) for 32A, or vice versa. Other geometries apply, triangular, rectangular, trapezoidal, etc.

The relation between the alignment axial groove(s) 32A' and axial grooves 32A, such as CS'>CS and/or W>W and/or D'>D, or different geometries, may be as taken at the forward axial face 36, i.e., the plane in which the cross-sectional dimensions are measured may lie on the forward axial face 36. In an embodiment, the axial grooves 32A and 32A' have constant cross-sectional dimensions in the axial direction.

Figure 5A:
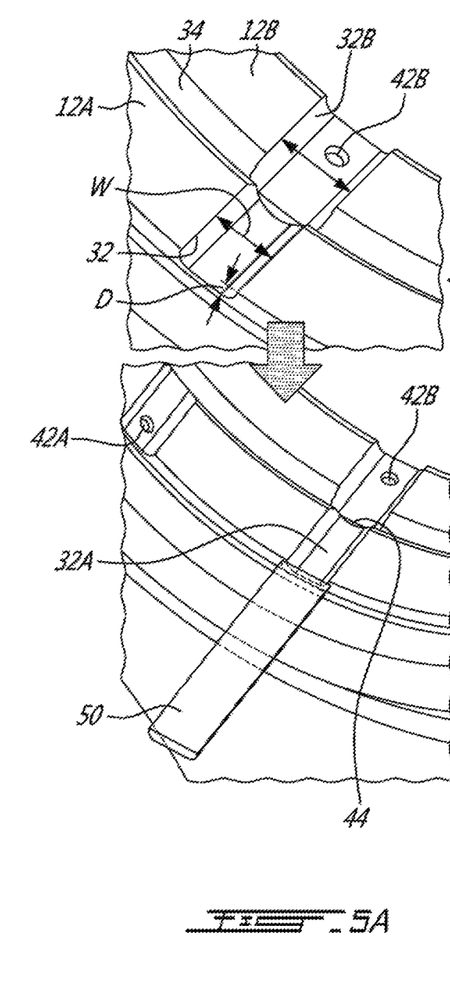
FIGS. 5A-5C are perspective views of lubrication paths when axial slots are misaligned or aligned in the inner ring assembly.
Figure 5B:
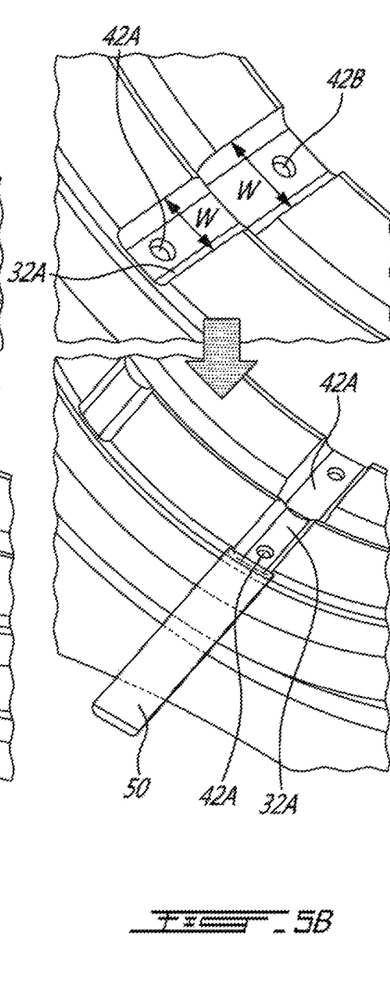
Figure 5C:
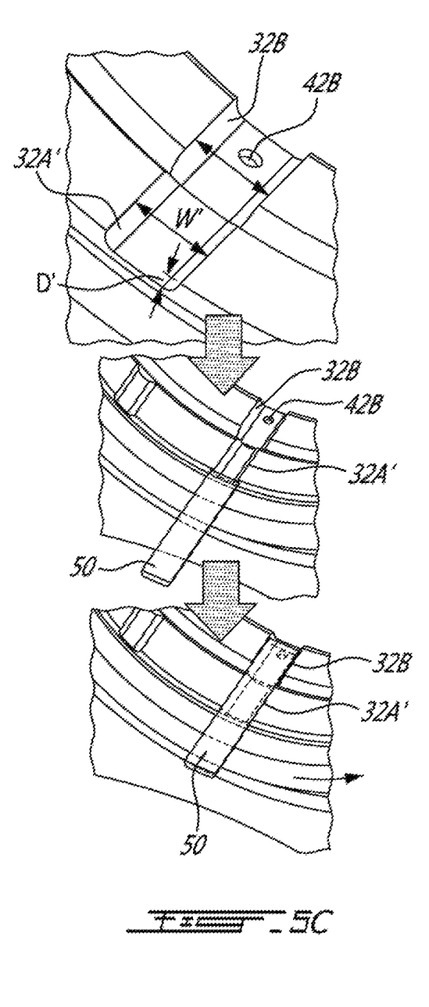

The cross-sectional dimensions of the alignment axial groove(s) 32A' may correspond to that of a gauge 50, as shown in FIGS. 5A-5C. The gauge 50 may be an elongated rod, bar, etc that is configured to be inserted into the alignment axial grooves 32A'. For example, the gauge 50 may be slid into the alignment axial groove 32A', for example from the forward axial face 36 in. In an embodiment, the cross-sectional shape of the alignment axial groove(s) 32A' and that of the gauge 50 are geometrically similar. In contrast, the gauge 50 is too large to be fully received in the axial grooves 32, or does not have a complementary shape and consequently abuts or does not fit smoothly or flush in the grooves 32. For example, as shown in FIGS. 5A-5C, the gauge 50 may be blocked from penetrating or from being slid into the axial grooves 32A because of mechanical interference.

The aft axial grooves 32B may also be large enough or adequately shaped to receive the gauge 50 therein, although this may not be required. In an embodiment the alignment axial groove 32A' and the aft axial grooves 32B have the same cross sectional dimensions CS' and/or W' and/or D', or same cross-sectional shape. In another embodiment, the aft axial grooves 32B may be larger in cross-sectional dimensions than the alignment axial groove 32A'. Therefore, the gauge 50 may be slid sequentially into the alignment axial groove 32A' and one of the aft axial grooves 32B from the forward axial face 36. It is also contemplated that the gauge 50 may be slid from the aft axial face 38, into an aft axial groove 32B and into the alignment axial groove 32A'. In such occurrences, the inner rings 12A and 12B reach the specific alignment, i.e., a planned alignment. In yet another embodiment, there may be a specific pairing of alignment axial groove 32A' and aft axial groove 32B, in which one of the aft axial groove 32B is also an alignment axial groove, i.e., it has greater dimensions than the other aft axial grooves 32B. This may be required if the groove distribution in the inner ring 12A and/or the inner ring 12B is not equidistant and repeated. In an embodiment, the groove distribution in the inner ring 12A is equidistant and repeated, i.e., the spacing between grooves of the same type is the same and the pattern of distribution is repeated, e.g. (1)-(1)-(2)-(3)-(1)-(1)-(2)-(3)- . . . . In such an arrangement or under such conditions, all of the type (3) axial grooves may be alignment axial groove 32A'.

Once the inner ring assembly 12 has been mounted to a shaft S, lubricating fluid is circulated to the inner ring assembly 12, for example from a radial scoop or an axial scoop depending on the space available for the bearing assembly 10, via the gallery 24. Therefore, the lubricant fluid is fed at the forward axial face 36 of the inner ring assembly 12.

In order to assemble the inner rings 12A and 12B, a user may rotate the inner ring 12A relative to the inner ring 12B for any one of the forward axial grooves 32A and 32A' to be aligned with one of the aft axial grooves 32B. The gauge 50 is then inserted in the forward alignment axial groove 32A' or an unsuccessful attempt is made to insert the gauge 50 in the axial grooves 32A. This insertion step may be performed before rotating the inner ring 12A relative to the inner ring 12B to identify the alignment axial groove 32A', to then rotate the rings 12A and 12B relative to one another to align the alignment axial groove 32A' with one of the aft axial grooves 32B. The relative rotation may include rotating the inner ring 12B and not the inner ring 12A. As another possibility, if there is also an alignment axial groove 32B, further rotation may be imported to align the alignment axial groove 32B with the alignment axial groove 32A', with the gauge 50 assisting in identifying the alignment axial groove 32B. When the gauge 50 penetrates in both alignment axial groove 32A' and aft axial groove 32B, the inner ring assembly 12 has attained its specific alignment. Stated differently, the alignment axial groove 32A' and aft axial groove 32B are indexed.

Therefore, the bearing assembly 10 may be aligned by: assembling a forward inner ring having forward axial grooves, against an aft inner ring having aft axial grooves; rotating the forward inner ring and aft inner ring relative to one another; and inserting a gauge concurrently in one of the forward axial grooves having cross-sectional dimensions greater than the other forward axial grooves, and into an aft axial groove. Inserting a gauge may include sliding the gauge into the forward axial groove from a forward face of the forward inner ring. A user may be blocked from inserting the gauge in the other forward axial grooves prior to inserting the gauge.

Therefore, in operation, the bearing assembly 10 is lubricated by: feeding a lubricating fluid to the forward axial grooves 32A of the forward inner ring 12A; diverting a first part of the lubricating fluid into forward passages 42A defined into the forward inner ring 12A in a first plurality of the forward axial grooves 32A; directing a second part of the lubricating fluid from a second plurality of the forward axial grooves 32A to a radial passages 44 defined at junction between the forward inner ring 12A and an aft inner ring 12B; directing another portion of the second part of the lubricating fluid from the forward axial grooves 32A including one or more alignment axial groove 32A' to the aft axial grooves 32B of an aft inner ring 12B and into aft passages 44B defined into the aft inner ring 12B. According to an embodiment, there may be a greater amount of the aft axial grooves 32B than of any of the types of axial grooves 32A.

The above description is meant to be exemplary only, and one skilled in the art will recognize that changes may be made to the embodiments described without departing from the scope of the invention disclosed. For example, the bearing assembly 10 is used as a high speed bearing to support the compressor shaft or the turbine shaft of a gas turbine engine. The axial grooves 32B may not extend all the way to the aft axial faces 38, but would be extend only to the related aft passages 42B. A bearing alignment assembly may include the gauge. Still other modifications which fall within the scope of the present invention will be apparent to those skilled in the art, in light of a review of this disclosure, and such modifications are intended to fall within the appended claims.

The invention claimed is:

1. A bearing alignment assembly comprising:
   an outer ring;
   an inner ring assembly disposed radially inwardly of the outer ring and cooperating therewith to form a roller volume, the inner ring assembly having a forward inner ring and an adjacent aft inner ring cooperating to provide an inner surface of the inner ring assembly, the forward inner ring including axial grooves extending axially along and circumferentially spaced around a forward portion of an inner circumferential surface of the inner ring assembly, at least one of said axial grooves of the forward inner ring being an alignment axial groove having at least one cross-sectional dimension different than a corresponding cross-sectional dimension of other of said axial grooves of the forward inner ring, the aft inner ring including axial grooves extending axially along and circumferentially spaced around an aft portion of the inner circumferential surface, at least one of said axial grooves of the aft inner ring having said different cross-sectional dimension and positioned on the aft inner ring for alignment with said alignment axial groove, and
   rolling elements rollingly disposed in the roller volume for relative rotational motion of the outer ring and the inner ring assembly.

2. The bearing assembly according to claim 1, wherein said forward axial grooves extend axially from openings in an axial face of the forward inner ring, the cross-sectional dimensions being different at the axial face.

3. The bearing assembly according to claim 1, wherein a first plurality of the forward axial grooves are in fluid communication with the roller volume through respective forward passages in the forward inner ring, a second plurality of the forward axial grooves being without forward passages in the forward inner ring so as not to be in fluid communication with the roller volume, the at least one alignment axial groove being in said second plurality of the forward axial grooves.

4. The bearing assembly according to claim 3, further comprising a third plurality of the forward axial grooves being in fluid communication with the roller volume through central passages in the inner ring assembly.

5. The bearing assembly according to claim 4, further comprising a circumferential groove in the inner circumferential surface of the inner ring assembly, the circumferential groove being in fluid communication with the roller volume through the central passages in the inner ring assembly.

6. The bearing assembly according to claim 5, wherein the circumferential groove is concurrently defined by a circumferential groove portion in the forward inner ring, and another circumferential groove portion in the aft inner ring.

7. The bearing assembly according to claim 3, wherein each of the forward axial grooves in the second plurality is one of the alignment axial groove.

8. The bearing assembly according to claim 1, wherein the alignment axial groove has a greater width and/or depth than that of the remainder of the forward axial grooves.

9. The bearing assembly according to claim 1, wherein the cross-sectional dimensions of the at least one alignment axial groove and of all of the aft axial grooves are the same.

10. A bearing alignment assembly comprising:
    a bearing assembly including an outer ring,
    an inner ring assembly cooperating with the outer ring to form a roller volume, the inner ring assembly having a forward inner ring and a aft inner ring concurrently forming an inner circumferential surface,
    the forward inner ring including forward axial grooves formed in, extending axially along and circumferentially spaced around the inner circumferential surface of the inner ring assembly, at least one of said forward axial grooves being an alignment axial groove having cross-sectional dimensions CS', while other said forward axial grooves having cross-sectional dimensions CS, wherein CS'>CS, and the aft inner ring including aft axial grooves formed in, extending axially along and circumferentially spaced around the inner circumferential surface, and rolling elements in the roller volume rollingly disposed against an inner circumferential surface of the outer ring and an outer circumferential surface of the inner ring assembly, the rolling elements allowing relative rotational motion between the outer ring and the inner ring assembly; and a gauge having cross-sectional dimensions CS' configured for being complementarily received in said alignment axial groove, and for being blocked from being complementarily received in the forward axial grooves having cross-sectional dimensions CS.

11. The bearing alignment assembly according to claim 10, wherein said forward axial grooves extend axially from openings in an axial face of the forward inner ring, the cross-sectional dimensions CS and CS' being at the axial face.

12. The bearing alignment assembly according to claim 10, wherein a first plurality of the forward axial grooves are in fluid communication with the roller volume through respective forward passages in the forward inner ring, a second plurality of the forward axial grooves being without forward passages in the forward inner ring so as not to be in fluid communication with the roller volume, the at least one alignment axial groove being in said second plurality of the forward axial grooves.

13. The bearing alignment assembly according to claim 12, further comprising a third plurality of the forward axial grooves being in fluid communication with the roller volume through central passages in the inner ring assembly.

14. The bearing alignment assembly according to claim 13, further comprising a circumferential groove in the inner circumferential surface of the inner ring assembly, the circumferential groove being in fluid communication with the roller volume through the central passages in the inner ring assembly.

15. The bearing alignment assembly according to claim 12, wherein each of the forward axial grooves in the second plurality is one of the alignment axial groove.

16. The bearing alignment assembly according to claim 10, wherein the alignment axial groove has a greater width and/or depth than that of the remainder of the forward axial grooves.

17. The bearing alignment assembly according to claim 10, wherein the cross-sectional dimensions of the at least one alignment axial groove and of the aft axial grooves are the same.

18. A method of assembling a bearing assembly comprising:

obtaining a bearing assembly having an outer ring, a split inner ring having forward and aft rings, the forward inner ring including axial grooves extending axially along and circumferentially spaced around the forward ring, one of said axial grooves of the forward inner ring being an alignment axial groove having at least one cross-sectional dimension different than a corresponding cross-sectional dimension of other of said axial grooves of the forward inner ring, the after inner ring including axial grooves extending axially along and circumferentially spaced around the aft inner ring, at least one of said axial grooves of the aft inner ring having said different cross-sectional dimension and positioned on the aft inner ring for alignment with said alignment axial groove;

assembling a forward inner ring with aft inner ring;

inserting a gauge having a cross-sectional dimension corresponding to said cross-sectional dimension of the forward inner ring alignment groove into said alignment axial groove;

rotating one of said forward inner ring or said aft inner ring until said alignment axial groove of the forward inner ring aligns with said at least one axial grooves of the aft inner ring; and inserting the gauge into said at least one axial grooves of the aft inner ring concurrently with said insertion in the alignment groove of the forward inner ring.

19. The method according to claim 18, wherein inserting a gauge includes sliding the gauge into the forward axial groove from a forward face of the forward inner ring.

20. The method according to claim 18, further comprising being blocked from inserting the gauge in the other said forward axial grooves prior to inserting the gauge.

* * * * *